(12) United States Patent
Sidler et al.

(10) Patent No.: US 9,156,722 B2
(45) Date of Patent: Oct. 13, 2015

(54) DEVICE FOR EXCHANGING AND FOR PREVENTING THE BENDING OF A PUSHING-IN BAR

(71) Applicant: Inmara AG, Pfaffikon (CH)

(72) Inventors: Werner Sidler, Malans (CH); Philipp Stauch, Itaslen (CH)

(73) Assignee: Inmara AG, Pfaffikon (CH)

( * ) Notice: Subject to any disclaimer, the term of this patent is extended or adjusted under 35 U.S.C. 154(b) by 0 days.

(21) Appl. No.: 13/933,348

(22) Filed: Jul. 2, 2013

(65) Prior Publication Data

US 2014/0008183 A1    Jan. 9, 2014

(51) Int. Cl.
  *B65G 35/00* (2006.01)
  *C03B 35/06* (2006.01)
  *C03B 35/10* (2006.01)

(52) U.S. Cl.
  CPC .................. *C03B 35/06* (2013.01); *C03B 35/10* (2013.01)

(58) Field of Classification Search
  CPC ........................................................ B65B 35/20
  USPC ......... 198/717, 719, 734, 736, 746, 747, 749, 198/750.1, 750.4, 750.6
  See application file for complete search history.

(56) References Cited

U.S. PATENT DOCUMENTS 3,687,262 A * 8/1972 Campbell et al. .............. 198/430
7,661,233 B2 * 2/2010 Stenvall .......................... 52/466

* cited by examiner

*Primary Examiner* — Gene Crawford
*Assistant Examiner* — Lester Rushin
(74) *Attorney, Agent, or Firm* — Volpe and Koenig, P.C.

(57) ABSTRACT

A device for exchanging and for preventing the bending of the pushing-in bar (27) having two pivoting arms (15) which are pivotably mounted on a support (9) and can be pivoted by a drive pinion (21). Supporting legs (25) which support the pushing-in bar (27) are fastened to the pivoting levers with the aid of a fastening element (29). One of the fastening elements (29) is fixedly connected to one of the supporting legs (25); the second fastening element (29) carries the pushing-in bar (27) without securing it in the longitudinal direction.

5 Claims, 3 Drawing Sheets

DEVICE FOR EXCHANGING AND FOR PREVENTING THE BENDING OF A PUSHING-IN BAR

INCORPORATION BY REFERENCE

The following documents are incorporated herein by reference as if fully set forth: Swiss Patent Application No. 01046/12, filed Jul. 5, 2012.

BACKGROUND

The subject of the invention is a device for exchanging and for preventing the bending of a pushing-in bar glass manufacturing In glass manufacture, the freshly formed still very hot glass items, for example bottles, are aligned substantially in a row, but not absolutely exactly. This is both with respect to the spacing and with respect to a straight line. In order to be able to further transport the glass items coming from the furnace, pushing-in devices are known which displace a pushing-in bar, having a multiplicity of fingers arranged at regular intervals next to one another, in the horizontal direction at a right angle to the longitudinal extent of the pushing-in bar. As a result of the thermal radiation of the glass items, which are still at a few hundred degrees, the pushing-in bar is very strongly heated on the one hand and tends to bend and, on the other hand, the spacings between the fingers on the pushing-in bar must be able to be changed as quickly as possible during a format change of the glass items to be transported in order to achieve as short a downtime as possible of the entire plant for manufacturing glass items.

SUMMARY

It is therefore an object of the present invention to provide a device by means of which a quick removal of the bar from the hottest zone in the vicinity of the glass items is possible and which device allows the pushing-in bar to be exchanged for another with a geometry for a different glass format within the shortest possible time and, moreover, allows the bar to be held in such a way that a bending thereof between the holding points which are usually situated at the ends of the pushing-in bar is ruled out as far as possible.

This object is achieved by a device having one or more features of the invention. Advantageous refinements of the devices are described below and in the claims.

A pivotable suspension of the pushing-in bar on the support of the pushing-in device allows the pushing-in bar to be moved very quickly forward into the operating position by a simple pivoting motion and likewise to be pivoted quickly back again after the operation in order to minimize the effect of the thermal radiation resulting from the hot glass items. The fastening element, or the suspension of the pushing-in bar on the support, makes it possible for the pushing-in bar to be quickly released from the support and exchanged with another pushing-in bar. Furthermore, the fastening of the pushing-in bar to the support makes it possible for the pushing-in bar to be held in a fixedly clamped manner only on one side in the longitudinal direction, and therefore the change in length caused by temperature differences does not result in bending of the pushing-in bar.

BRIEF DESCRIPTION OF THE DRAWINGS

The invention will be explained in more detail with reference to an illustrated exemplary embodiment. In the drawings.

DETAILED DESCRIPTION OF THE PREFERRED EMBODIMENTS

Figure 1:
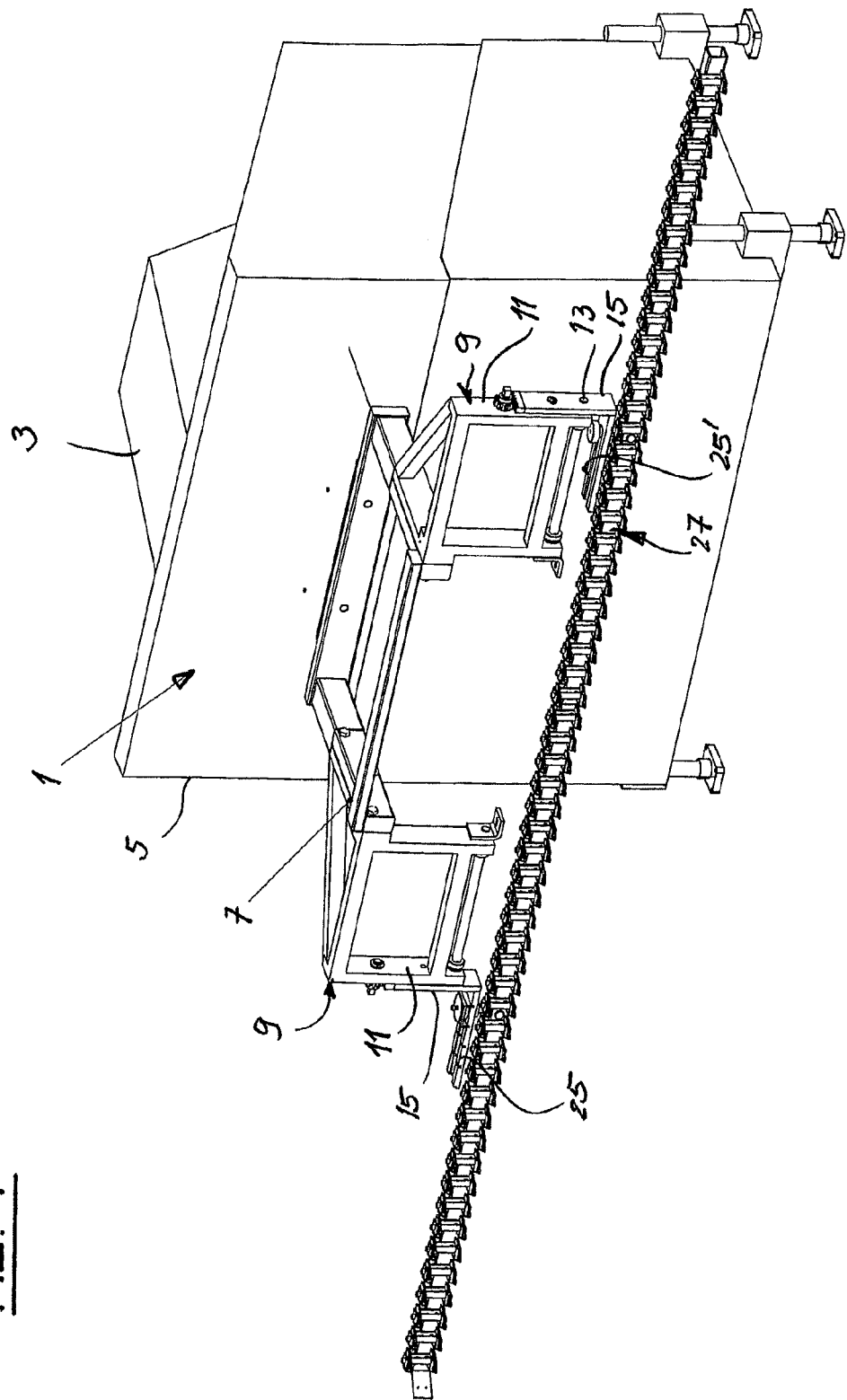
FIG. 1 shows a pushing-in device with a support fastened thereto and the pushing-in bar fastened to the support
Figure 3:
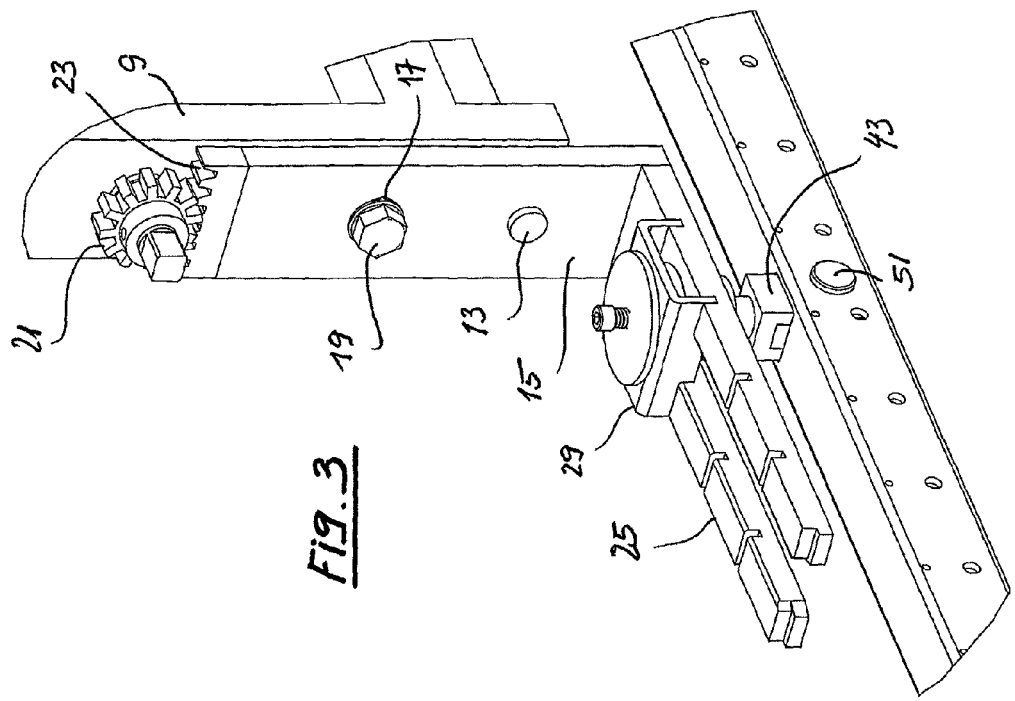
FIG. 3 shows an enlarged illustration of the pivoting arm with the fastening element for the pushing-in bar, after the connection of the two elements.
Figure 4:
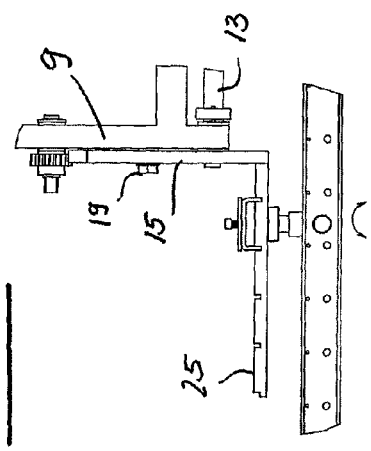
FIG. 4 shows a side view of the pivoting arm and of the pushing-in bar (in detail)
Figure 5:
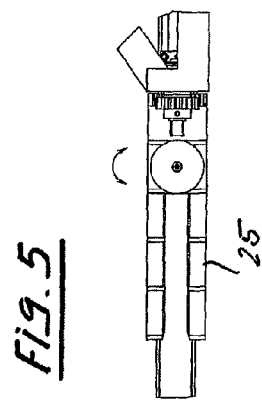
FIG. 5 shows a plan view of the pivoting arm and the pushing-in bar, according to FIG. 4.

Reference sign 1 is used in FIG. 1 to designate a pushing-in device which is accommodated in a housing 3 which receives the control elements and the mechanical elements, such as drives. Projecting from the front side 5 of the pushing-in device 1 are two telescopic arms 7 on whose ends is fastened a respective support 9. On the two external vertically extending posts 11 of the supports 9, a respective pivoting arm 15 is articulated or mounted on pivot pins 13, for example shaft stubs. Horizontally extending slots 17 are made in the pivoting arms 15 above the bore for the pivot pin 13, through which slots the shank of a screw 19 is guided with play. The screw 19, of which only a hexagon head can be seen, is held in a threaded hole in the support 9. The screw 19 serves to limit the pivoting angle of the pivoting arm 15. The pivoting movement takes place via a toothed pinion 21 which meshes with teeth 23 on the upper end of the pivoting arm 15 (FIG. 3).

A supporting leg 25 is fastened to the lower end of the pivoting arm 15, at a right angle thereto. The supporting leg 25 can also be comprised of two supporting leg profiles which are situated parallel to and at a distance from one another (as illustrated).

Figure 2:
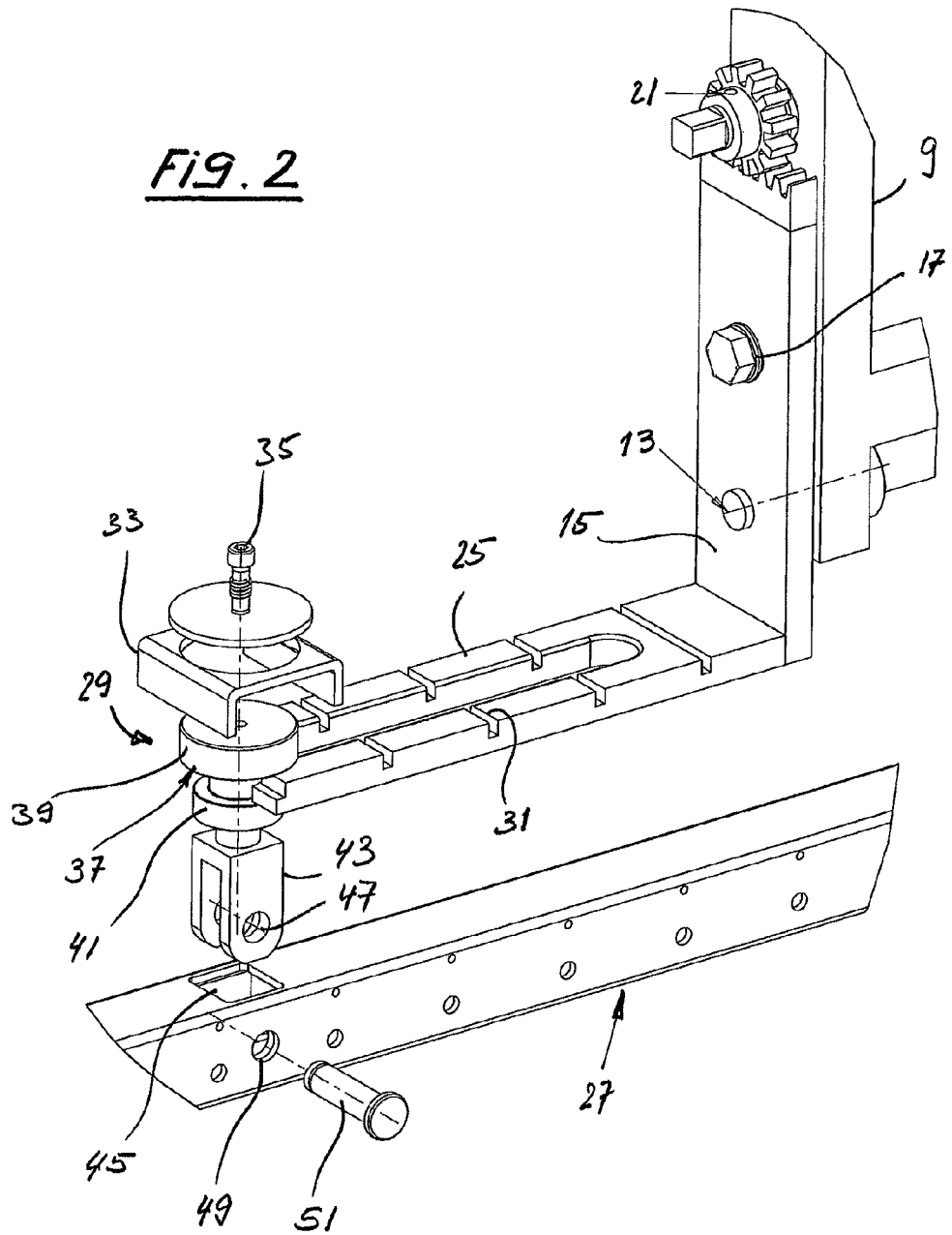
FIG. 2 shows an enlarged illustration of the pivoting arm with the fastening element for the pushing-in bar, before the connection of the two elements.

FIG. 2 depicts, below the supporting leg 25, a pushing-in bar 27 which can be connected to the support leg 25 by a fastening element 29. To exactly position the fastening element 29 on one of the supporting legs 25, grooves 31 are made in the latter at regular intervals. The edges of an inverted U-shaped profiled element 33 engage in the grooves 31 when the fastening element 29 is firmly clamped on the supporting leg 25 by a clamping screw 35. The clamping screw 35 is connected to a, for example rotationally symmetrical, body 37 which comprises two disks 39 and 41 which can be displaced relative to one another by means of the screw 35 in order to firmly clamp the fastening element 29 on the supporting leg 25. Arranged on the lower end of the body 37 is a fork-shaped holding part 43 which is designed such that it can be introduced into a cutout 45 in the upper side of the pushing-in bar 27. In the fork-shaped ends of the holding part 43 are made two aligned bores 47 which, when the holding part 43 is inserted into the opening 45 in the pushing-in bar 27, are aligned with second bores 49 correspondingly arranged in the pushing-in bar 27. A bolt 51 can be used to connect the holding part 43 and the pushing-in bar 27 to one another.

As an alternative to grooves 31 in the supporting leg 25, vertically extending bores made at regular intervals can also be formed, in which bores pins correspondingly formed on the profiled element 33 can engage (not illustrated).

In the overview representation of the pushing-in device 1 in FIG. 1, a supporting leg 25 is represented on the left-hand side of the figure. The supporting leg 25' on the right-hand side does not have any grooves 31 or holes. This allows a suspension of the pushing-in bar 27 on the pivoting arm 15 without the pushing-in bar 27 here being clamped in the longitudinal direction. In other words, the pushing-in bar 27 can expand to the right in the longitudinal direction when it comes into the vicinity of the hot glass items.

The pivoting movement of the pivoting arm 15 takes place via a rotary drive (not shown) for the pinion 21.

Exchanging the pushing-in bar 27 is therefore very simple in that the two bolts 51 can be withdrawn and in this way the pushing-in bar 27 can be removed from the supporting legs 25 and replaced by another one without a tool.

KEY TO THE REFERENCE SIGNS

1 Pushing-in device
3 Housing
5 Front side
7 Telescopic arm
9 Support
11 Posts
13 Pin
15 Pivoting arm
17 Slots
19 Screws
21 Toothed pinion
23 Teeth
25 Supporting leg
27 Pushing-in bar
29 Fastening element
31 Grooves
33 Profiled element
35 Clamping screw
37 Body
39 Disk
41 Disk
43 Holding part
45 Cutout
47 Bores
49 Second bores
51 Bolt

The invention claimed is:

1. A device for exchanging and for preventing bending of a pushing-in bar for transverse transportation of hot glass items on a glass forming machine, comprising a pushing-in bar (27), and two pivoting arms (15) upon which the pushing-in bar is mounted, the two pivoting arms move the pushing-in bar from a working position into a clearance position, the pivoting arms (15) are formed as two-armed levers, with a supporting leg (25) for the pushing-in bar (27) formed on a first end thereof and a toothing (23) formed on a second end thereof, said toothing engages with a drive pinion (21) for pivoting the pushing-in bar (27), and the supporting leg (25) of one of the pivoting arms (15) comprises a latch (31) for latching in fastening elements (29) for the pushing-in bar (27) for a fixed connection to the pushing-in bar in a longitudinal direction thereof and the other supporting leg (25') is in a non-fixed connection to the pushing-in bar allowing for a free displacement of the pushing-in bar (27) in a longitudinal direction with respect to the fixed connection at the supporting leg (25) to allow for heat expansion.

2. The device as claimed in claim 1, wherein the latch comprise grooves (31) for insertion of latching profiles (33) or bores for introduction of protuberances.

3. The device as claimed in claim 2, wherein holding elements (35, 37, 43) for holding the pushing-in bar (27) are formed on the fastening elements (29).

4. The device as claimed in claim 3, wherein the holding elements (43) are insertable into a cutout (45) in the pushing-in bar (27), and are connectable to the pushing-in bar by a bolt (51).

5. The device as claimed in claim 4, wherein a connection between the fastening elements (29) and holding elements (43) is articulated.

* * * * *